United States Patent Office 3,746,681
Patented July 17, 1973

3,746,681
PROCESS OF PREPARING FINELY DIVIDED THERMOPLASTIC RESINS
Dorothee M. McClain, Cincinnati, Ohio, assignor to National Distillers and Chemical Corporation, New York, N.Y.
No Drawing. Continuation-in-part of abandoned application Ser. No. 775,147, Nov. 12, 1968, which is a continuation of application Ser. No. 370,006, May 25, 1964, now Patent No. 3,422,049, which in turn is a continuation-in-part of abandoned application Ser. No. 160,733, Dec. 20, 1961. This application July 6, 1971, Ser. No. 160,194
The portion of the term of the patent subsequent to Jan. 14, 1986, has been disclaimed
Int. Cl. C08b *29/36;* C08f *47/18;* C08g *53/20*
U.S. Cl. 260—29.6 PM       7 Claims

ABSTRACT OF THE DISCLOSURE

A process for preparing finely divided thermoplastic resins such as polyethylene which comprises vigorously agitating molten resin in admixture with water and in the presence of a block copolymer of ethylene oxide and propylene oxide to produce a fine dispersion, and then cooling the resulting dispersion to a temperature below the melting point of the resin. The recovered finely divided thermoplastic resins are characterized by a narrow particle size distribution and substantially spherical shapes.

---

This invention relates to a process for making finely-divided, normally solid, synthetic organic polymeric thermoplastic resins. It is a continuation-in-part of U.S. patent application Ser. No. 775,147, filed Nov. 12, 1968, now abandoned which is a continuation of U.S. patent application Ser. No. 370,006, filed May 25, 1964 and issued on Jan. 14, 1969 as U.S. Pat. No. 3,422,049, which was a continuation-in-part of Ser. No. 160,733 filed Dec. 20, 1961, now abandoned.

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additive; mold release agent for rubber; additives to waxes, paints, and polishes; binder for non-woven fabrics; and so on.

Prior art processes for making normally solid finely-divided organic polymeric thermoplastic resins from coarser forms such as cubes, pellets, coarse powders, and the like, which forms usually are obtained directly from the synthesis process, have been concerned primarily with polyolefins. These processes of subdivision are of three main types; mechanical grinding, solution, and dispersion.

In the first type, the polyolefin in granular form is passed through a high shear pulverizing device, e.g., a Pallmann grinder, to yield particles of irregular shape having diameters ranging from about 75 to 300 microns. In addition to requiring specially designed equipment, such processes yield powders which are not entirely suitable for fluidization or dispersion application wherein spherical particles of narrow size distribution are required.

The second type of prior art process generally entails dissolving the polymer in a solvent, followed by precipitation of the polymer in finely-divided form through addition of a nonsolvent or evaporation of the solvent or a combination of the two. Emulsifying agents sometimes are employed to aid particle breakdown. Inherent in such processes are difficulties in manipulating the solvents, completing removal of the solvent from the product and classifying the resultant powders. The powders from such processes are of irregular, somewhat rounded shape, and consequently possess only moderately satisfactory fluidization characteristics.

The third type of prior art process involves dispersion under high shear agitation of a polymer in a liquid medium with the aid of various dispersing agents. From the standpoint of cost and simplicity of operation, water is generally the preferred dispersing medium. The dispersing agents usually comprise a soap such as sodium stearate or some other type salt. Processes wherein such agents are used generally require all or a portion of the dispersing agent to be incorporated into the polymer in a separate step preceding dispersion in water. In cases where the final product is desired in a powdered state, the presence of dispersing agent residues in the polymer generally creates undesirable changes of the original polymer properties, e.g., increased water-sensitivity, loss of electrical insulating values, and the like. Removal of such residues is generally difficult, however, and often impossible. Another disadvantage of these dispersing agents is that they tend to become inactive at temperatures below which only relatively low molecular weight polyolefins are sufficiently fluid to be dispersible in water. Consequently, such prior art processes have generally been limited to relatively low molecular weight polyethylenes.

Accordingly, it is an object of this invention to provide a process for making finely-divided synthetic organic polymeric thermoplastic resins.

Another object of the present invention is to provide a process for making finely-divided polyolefins which does not require the specialized equipment or solvent combinations required by prior art processes.

A more particular object of this invention is to prepare finely-divided synthetic organic polymeric thermoplastic resins by means of an aqueous dispersion process.

A still more particular object is to make finely-divided polyolefins of relatively high molecular weight by means of an aqueous dispersion process.

A further object is to prepare finely-divided synthetic organic thermoplastic resins which are substantially devoid of particles larger than 500 microns and wherein the particles have a relatively narrow size range and are of spherical shape.

Another particular object is to make a finely-divided polyolefin which is substantially devoid of particles greater than 25 microns, wherein the average particle size is less than 10 microns, and wherein the particles are of spherical shape.

Another object is to prepare dispersions of ethylene polymers and copolymers which are latices.

These and other objects are accomplished by a process in which a normally solid synthetic organic polymeric thermoplastic resin is subjected to vigorous agitation in the presence of water and a block copolymer of ethylene oxide and propylene oxide as the dispersing agent at a temperature above the melting point of the resin and at a pressure sufficient to maintain the water in a liquid state until a dispersion is produced and thereafter cooling said dispersion to below the melting point of the resin.

In general, the polymers suitable for the practice of this invention include any normally solid synthetic organic polymeric thermoplastic resin whose decomposition point is somewhat higher than its melting point and somewhat less than the critical temperature of water. Included are polyolefins, vinyls, olefin-vinyl copolymers, olefin-allyl copolymers, polyamides, acrylics, polystyrene, cellulosics, polyesters, and fluorcarbons.

The polyolefins most suitable for the practice of this invention include normally solid polymers of olefins, particularly mono-alpha-olefins, which comprise from two to about six carbon atoms, e.g., polyethylene, polypropylene, polybutene, polyisobutylene, poly(4-methylpentene), and the like. Preferred polyolefin feeds are polyethylene and polypropylene. Olefin-olefin copolymers such as ethylene copolymers with propylene, butene-1 and hexene-1 are also suitable. Of particular significance is the fact that the present process is not limited to the relatively low molecular weight polyethylenes of prior art processes, but is equally effective for relatively high molecular weight polyethylene as well as for polypropylene and other higher olefins.

Vinyl polymers suitable for use in this invention include polyvinyl chloride, polyvinyl acetate, vinyl chloride/ vinyl acetate copolymers, polyvinyl alcohol, and polyvinyl acetal. Especially preferred is polyvinyl chloride.

Suitable olefin-vinyl copolymers include ethylene-vinyl acetate, ethylene-vinyl trimethyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like. Especially preferred are ethylene-vinyl acetate copolymers, including particularly copolymers having vinyl acetate concentrations of about 20 to about 60 weight percent.

Suitable olefin-allyl copolymers include ethylene-allyl alcohol, ethylene-allyl acetate, ethylene-allyl acetone, ethylene-allyl benzene, ethylene-allyl ether, ethylene-acrolein, and the like. Ethylene-allyl alcohol is especially preferred.

Preferred among the polyamides are linear superpolycarbonamide resins, commonly referred to as nylons. Such polymers can be made by the intermolecular condensation of linear diamines containing from 6 to 10 carbon atoms with linear dicarboxylic acids containing from 2 to 10 carbon atoms. Equally well the superpolyamides may be made from amide-forming derivatives of these monomers such as esters, acid chlorides, amine salts, etc. Also suitable are superpolyamides made by the intramolecular polymerization of omega-amino-acids containing 4 to 12 carbon atoms and of their amide-forming derivatives, particularly the internal lactams. Examples of specific nylons are polyhexamethylene adipamide, polyhexamethylene sebacamide, and polycaprolactam. Especially preferred are nylons having intrinsic viscosities ranging between 0.3 and 3.5 dl./g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

In general, thermoplastic resins to which this invention is applicable may have melting points as low as 30° C. For example, relatively low density (0.80–1.00 g./cc.) polymers of the types described above which have melting points in the range of about 50° C. to about 115° C. are useful herein. Such low density polymers particularly include homopolymers of ethylene and low density copolymers of ethylene with such monomers as propylene, butene-1, hexene-1, vinyl acetate, vinyl trimethyl acetate, methyl acrylate, ethyl acrylate, vinyl alcohol and allyl alcohol. Preferred resins are ethylene homopolymers having densities from 0.85–0.95 g./cc. and melting points from 90° C. to 115° C. and ethylene copolymers from the above group having densities from 0.85–1.00 g./cc. and melting points from 55° C. to 115° C.

The dispersing agents of the present invention are water-soluble block copolymers of ethylene oxide and propylene oxide. Preferably, they are water-soluble block copolymers of ethylene oxide and propylene oxide having a molecular weight above about 3,500 and containing a major portion by weight of ethylene oxide. Such compounds are both stable and effective as dispersing agents for the aforementioned thermoplastic polymers at temperatures ranging up to about 325° C. or higher, and more particularly at temperatures above about 160° C., especially at temperatures in the range of about 175° to 225° C. Representative of such compounds are several of the non-ionic surface active agents marketed by Wyandotte Chemicals prepared (see the Pluronic Grid Approach, vol. II, Wyandotte Chemicals Corp., 1957) by polymerizing ethylene oxide on the ends of a preformed polymeric base of polyoxypropylene. Both the length or molecular weight of the polyoxypropylene base and the polyoxyethylene end segments can be varied to yield a wide variety of products. For example, one of the compounds discovered as suitable for the practice of this invention is Pluronic F–98 wherein a polyoxypropylene of average molecular weight of 2,700 is polymerized with ethylene oxide to give a product of molecular weight averaging about 13,500. This product may be described as containing 20 weight percent of propylene oxide and 80 weight percent of ethylene oxide.

Examples of other effective Pluronics include P–105 (M.W. 6,500, 50% propylene oxide, 50% ethylene oxide), F–88 (M.W. 11,250, 20% propylene oxide, 80% ethylene oxide), F–108 (M.W. 16,250, 20% propylene oxide, 80% ethylene oxide), and P–85 (M.W. 4,500, 50% propylene oxide, 50% ethylene oxide). These compounds, containing at least about 50 weight percent of ethylene oxide and exhibiting a molecular weight of at least about 4,500, are particularly effective as dispersing agents for the aforementioned thermoplastic polymers.

These compounds are both stable and effective at temperatures ranging up to about 325° C. or higher, and more particularly at temperatures above about 160° C., especially at temperatures in the range of about 175° to 225° C. The ability of these compounds to retain effectiveness as dispersing agents at high temperatures is extremely significant and useful. As aforementioned, the dispersing or emulsifying agents known to the art for preparing aqueous dispersions of polyethylene are chiefly soaps. Such soaps have been found to exert their emulsifying ability at temperatures ranging up to about 160° C., but to become inactive at higher temperatures. Since in many instances dispersion temperatures appreciably higher than 160° C. are either necessary or highly desirable, these soaps are severly limited in ability.

The temperature of operation is dependent upon the melting point, melt flow properties, decomposition temperature, and desired fineness of dispersion of the selected synthetic organic thermoplastic resin. While such resins can be dispersed at temperatures commencing with their respective melting points, increases in dispersion temperature beyond the melting point and up to the decomposition of the resins are generally accompanied by corresponding increases in the fluidity of the molten resin. As the fluidity of the melt increases, the dispersions generally tend to develop lower average particle sizes without requiring increases in agitation effort.

The flow properties of a molten polymeric resin are closely related to its molecular weight. As the molecular weight of a given type of polymer is increased, its fluidity at a given temperature tends to lessen, that is, the polymer tends to offer greater resistance to breakdown to small particles. On the other hand, the melting point of the polymer varies little with changes in molecular weight. Consequently, while two polymers of the same type, e.g., low density polyethylene, but of different molecular weights may exhibit the same melting point and therefore be dispersible commencing at the same temperature, the higher molecular weight polymer will require high dispersion temperatures for the same agitation effort to achieve a fineness of dispersion equivalent to that of the polymer of lower molecular weight.

A convenient measure of the fluidity or flow of a thermoplastic polymer is afforded by the melt flow rate value as outlined under ASTM test method D1238–57T (2160 gram load).

As aforementioned, the soap dispersing agents of the prior art are limited to dispersions formed at temperatures below about 160° C. At these temperatures and using a soap as the dispersing agent, only polyethylenes exhibiting a melt flow rate of about 15 or higher at such temperatures, for example, low density polyethylenes of low molecular weight, could be dispersed to average particle sizes in the 5 to 20 micron range, and then only through very severe shearing action such as requires use of a high speed, narrow gap colloid mill or its equivalent. Soap dispersing agents did not prove effective for preparing fine dispersions of relatively high molecular weight low density polyethylene, higher melting polyolefins such as linear polyethylene or polypropylene, or other higher melting polymers such as nylon, polyvinyl chloride, polymethyl methacrylate, and the like.

Polymers which either do not melt or which exhibit melt flow rates below about 15 at temperatures below 160° C. can be readily dispersed by means of the subject novel dispersing agents to dispersions substantially devoid of particles larger than 500 microns and wherein the particles have a relatively narrow size range. Where it is desired to prepare the finest dispersion of a given polymer, the dispersion temperature should be such that the resin being dispersed exhibits a melt flow rate of greater than 15, and, more preferably, greater than 20. Where larger average particle sizes are desired or acceptable, however, dispersion temperatures may be employed, still in combination with only relatively mild agitation, at which the polymer exhibits a melt flow rate appreciably lower than 15, for example, as low as about 2.

The dispersing apparatus or device may be any device capable of delivering at least a moderate amount of shearing action under elevated temperatures and pressures to a liquid mixture. Suitable, for example, are conventional autoclaves equipped with conventional propeller stirrers. Propellers designed to impart greater shear to the mixture tend to improve the recovered yield of pulverulent polymer, but with little effect on the particle size and distribution of recovered polymer. The particle size and distribution are somewhat dependent on the stirring rate, higher stirring speeds resulting in finer and narrower dispersions until an optimum speed is reached above which there is little change. The overall recovery yield of pulverulent polyolefin from the dispersion is dependent upon the duration of stirring. For a given type and rate of stirring, a period of stirring exists within which maximum recoverable yields of pulverulent polyolefins result. Either shorter or longer periods of shearing result in lower recoverable yields. Preferred stirring periods generally will range from about 1 to 20 minutes, and preferably from about 5 to 15 minutes. It will be understood, however, that the stirring rates and periods will depend upon the type of equipment utilized.

While the rate and duration of agitation affect particle size and distribution and recoverable yields of pulverulent polymer, these variables can be readily optimized for any given polyolefin through simple, routine experimentation. For example, it was found that in a conventional, two-liter stirred pressure reactor (Parr Instrument Company) equipped with a turbine type stirrer polyethylene exhibiting a melt flow rate of 26 at 200° C. yielded the finest dispersion at a stirring rate of 8,000 to 10,000 r.p.m. for a duration of 8 to 9 minutes at 200° C. In a 1.5-gallon stainless steel reactor equipped with a curved-blade stator and a curved-blade rotor driven by a four-horsepower air motor, the same polyethylene yielded the finest dispersion at a stirring rate of 300 to 800 r.p.m. at 200° C.

In carrying out the subject process, the selected synthetic organic thermoplastic polymer is first contacted with water and the dispersing agent. It is a particularly advantageous feature of this invention that the dispersing agent need not be incorporated into the polymer prior to the introduction of the water by such means as milling and the like, but may be introduced into the dispersing apparatus simultaneously with the other ingredients or as a solution in the aqueous phase. If desired, the dispersion process may be operated in a continuous manner, in which case it is convenient to premix the desired ratio of dispersing agent, water, and polymer, and introduce this mixture continuously to the reactor while continuously removing from another part of the reactor the product dispersion.

The amount of water used in relation to the polymer dispersed generally ranges from about 0.33 to 9 parts by weight of water per part of normally solid polymer, preferably between about 0.8 and 4 parts per part of polymer. To prepare dispersions which are more dilute, it is usually more economical to dilute a more concentrated dispersion. Despersions containing more than about 75 percent of polymer are generally quite viscous and difficult to handle. To a limited extent the dispersion becomes finer as the concentration of polymer increases, other conditions being held constant.

As little as about 0.5 part by weight of dispersing agent per 100 parts of normally solid polymer may be used to produce the desired dispersions, however, it is preferred to use from about 2 to 25 parts of dispersing agent per 100 parts of polymer. Larger ratios of dispersing agent exhibit no significant influence on the fineness of dispersion and tend to make subsequent removal of the surfactant from the polymer more difficult.

In the specific embodiment of this invention wherein it is desired to prepare polymers at very fine particle size, for example, olefin homopolymers and olefin copolymers whose average particle size is below about 10 microns, upon feeding the ingredients to the dispersing device the temperature is brought to a level at which the melt flow rate of the polymer being dispersed is at least 15, and more preferably at least 20. Generally, the temperature at which the polymers of the invention exhibit melt flow rates of at least 15 ranges from about 110° C. for low molecular weight polymers, e.g., low molecular weight low density polyethylene, up to the critical temperature of water for the relatively high molecular weight and highly crystalline polymers. For the preferred polymers, dispersion temperatures range from about 160° to 325° C. For example, a polymer such as a linear polyethylene with a flow rate of 10 at 190° C. requires a dispersion temperature of about 245° C., whereas a polymer such as a polypropylene with a melt flow rate of 7 at 230° C. requires a dispersion temperature above about 265° C. As aforementioned, the use of lower temperatures, that is, down to the melting point of the polymer, will also yield dispersions, but of a coarser particle size.

The pressure under which the present process is carried out is so adjusted to exceed the vapor pressure of water at the operating temperature so as to maintain a liquid water phase. More particularly, the pressures may range from about 1 to 217 atmospheres, and preferably from about 6 to 120 atmospheres. In cases where the polymer is sensitive to air at the elevated dispersion temperatures, an inert gas, e.g., nitrogen or helium, may be substituted for the air normally present, and deaerated water used.

The dispersions resulting from the above process are compositions comprising a dispersion of a normally solid synthetic organic polymeric thermoplastic resin in water in the presence of a minor amount of a block copolymer of propylene oxide and ethylene oxide. If the dispersion is capable of forming a continuous film upon removal of the aqueous phase by evaporation, it is more definitely termed a latex. The above dispersions or latices may be utilized in coating metal or paper, in polish formulations, in paint formulations, for textile sizing and waterproofing, for coating fibers, etc.

In the case of dispersions which are not latices, the temperature of the dispersion may be lowered to below the melting temperature of the dispersed polymer, and the polymer separated from the aqueous phase in the form of discrete particles by filtration, evaporation of the water, and the like. If the temperature of the subject dispersion is lowered to below the boiling point of water and the pressure released, the finely-divided polymer may be recovered by simple atmospheric filtration. Dispersions whose number average particle size is below about 10 microns are relatively stable as such and thus should be broken by dilution with added water prior to filtration. It is an outstanding feature of this invention that the finely-divided polymer recovered, after several washings with water, has substantially no residual dispersing agent and, consequently, requires no subsequent treatment or heating step to remove or inactivate the dispersing agent residues where the presence of such residues would be considered undesirable. The aqueous filtrate and washings contain substantially all of the dispersing agent originally added, in unchanged form, and thus may be recycled to act as the dispersion medium for subsequent batches of polymer.

Drying of the recovered finely-divided polymer yields a free-flowing powder of fine particle size and narrow particle size distribution. Generally, all of the dispersed particles have diameters less than 500 microns. By varying the composition of the subject novel dispersing agents and the ratio of polymer to water, average particle size ranging from about 300 microns to as low as 5 microns or below can be obtained. Especially preferred are particles of narrow size distribution wherein the number of average particle size is less than 20 microns, and more desirably less than 10 microns. Generally, as the ratio of ethylene oxide to propylene oxide is increased in the subject novel dispersing agents and the ratio of polymer to water is increased, the average particle size is decreased. Further and unexpectedly, the particles of the subject process are almost perfect spheres. The spherical shape contributes superior fluidization characteristics, a shorter melting time, and improved dispersibility to the pulverulent compositions. Consequently, the finely-divided polymers of this invention are superior in powder form for static or fluidized dip coating, spraying, dusting, and flame spraying applications as well as for preparing stable dispersions in water or some other medium for use in roller, dip, or spray coating. The relatively high molecular weight polymers of this invention also find use in the preparation of heat resistant coatings, in the preparation of molded or formed shapes by powder or slush molding techniques, and in the preparation of foams in combination with conventional blowing agents.

The aforenoted latices may be prepared within the framework of this invention through the use of a combination of selected polymers or copolymers and particular dispersing conditions. Included among the polymers and copolymers suitable for dispersion to latices are low density polyethylenes having at 190° C. a melt flow rate above about 3000, and particularly between about 4000 and 10,000. Also included are copolymers of low density polyethylene and vinyl acetate wherein the vinyl acetate constitutes at least 25 percent, and preferably between 30 and 40 percent of the final copolymer, and wherein the copolymers exhibit at 190° C. melt flow rates of at least 15, and preferably between about 25 and 7,000. Dispersion temperatures suitable for producing the above latices are generally above about 160° C., and preferably range from about 175° to 225° C.

The resultant latices by definition deposit continuous films when the aqueous medium is permitted to evaporate under uniform and mild conditions, such as in air at ambient temperature and atmospheric pressure. This property imparts important and useful value to the latices which can be used for applying continuous film coatings at ambient temperature to substrates such as paper, paperboard, metal foil, glass, plastic film or sheet, and the like, and for waterproofing fibers and textiles. The latices comprise extremely fine particles of narrow particle size distribution. For example, the polyethylene latices had number average particle sizes of less than 1 micron with at least 50 weight percent of the particles below 4 microns, whereas the ethylene-vinyl acetate latices had number average particle sizes of less than 3 microns with at least 50 weight percent of the particles below 10 microns.

The following examples will further illustrate this invention without limitation. All parts are by weight unless otherwise indicated.

The apparatus comprised a cylindrical two-liter, 4-inch diameter pressure reactor (Parr Instrument Company) equipped with a thermowell, a safety head, a stirrer bearing and shaft, and a pressure gage. Power was supplied to the stirrer by means of a Bodine type fractional horsepower motor having an output of 18,000 r.p.m. (idling). The stirring propeller was either a conventional blade type (3 blades, 2-inch diameter) or a type comprising two curved tooth turbine-type discs (3-inch diameter).

In the following examples, three techniques were employed to characterize the particle characteristics of the products. One of these involved sieving by means of a Roto-Top or Air-Jet sieve using appropriate ASTM sieves. Results of sieving analyses are expressed as weight percent passing a sieve of a particular mesh size.

A second technique utilized microscopic analysis. A sample of the dispersion was diluted with water, and a drop of the diluted dispersion was placed under the microscope between a microscopic slide and a cover slip. By means of a calibrated ocular the sizes of 100 representative particles, well-distributed in the microscopic field (600× magnification) were classified into size groups (<5, 5 to 10, 10 to 25, 25 to 50, and 50 to 100 microns). On the basis of duplicate counts, results are expressed in terms of the size of the largest particle observed and the number average particle size.

A third technique involved the use of an electronic Coulter counter. This technique was particularly useful where a more precise count was desired and with dispersions, such as latices, where sieving and microscopic counts were impractical. The Coulter counter determines the number and volume of particles suspended in an electrically conductive liquid as these particles flow singularly through a small aperture having an immersed electrode on each side. As a particle passes through the aperture, it displaces electrolyte within the aperture and thereby momentarily changes the resistance between the electrodes, causing a voltage pulse of magnitude proportional to the volume of the particle. The pulses for the particles of the sample are electrically amplified, sealed, and counted. From these counts, generally made on several million particles, accurate distribution curves of both number and weight percent can be established. Results are expressed in terms of the largest and smallest particles counted, the 50 percent weight percentile size, and the number average particle size.

Normal particle size distribution curves plotted as particle diameter versus percent (cumulative weight percent as well as cumulative number percent) of dispersions which were made under optimum conditions have a sigmoid shape. The curve of the particle number percent is similar to that of the particle weight percent except that it is below that of the latter one. In a narrow particle size distribution (1 to 25 microns) the value of the average particle size is 60 to 80 percent of that of the 50 weight percentile or very close to that of the 50 number percentile. In a wider distribution (1 to 30 microns) it is from 20 to 40 percent of it. Checks of sieve analysis showed good agreement with particle size counts obtained on the Coulter counter.

EXAMPLE I (A) 300 parts of a polyethylene having a density of 0.915 g./cc., a melt flow rate of 22 g. per 10 min. at 190° C., and a melting point of 103° C., in the form of small chips, 18 parts of a block copolymer of ethylene oxide and propylene oxide of a molecular weight of 13,500 and containing 20 percent by weight of propylene oxide and 80 percent by weight of ethylene oxide (Pluronic F98), and 273 parts of deaerated water were charged to the reactor. The air was replaced by nitrogen and heat was applied until the temperature of the mixture reached 200° C. at a pressure of 235 p.s.i. Stirring was then started and continued at a rate of 8,000 to 10,000 r.p.m. for a period of 8 to 10 minutes. Stirring was then discontinued, and the temperature of the dispersion was allowed to drop under ambient cooling to about 90° C. The residual pressure was then bled off, the obtained dispersion was diluted with an equal volume of water, and this mixture was suction-filtered on a Buchner funnel fitted with a #41 H Whatman filter paper. The residue was washed thoroughly with water and then dried for 4 hours at 60° C. The dried polyethylene residue comprised 300 parts of a fine, white powder having a melt flow rate of 22 g. per 10 min. at 190° C. A sieve analysis gave the following particle size distribution: 100 weight percent passing 500 microns, 78 weight percent passing 53 microns. Microscopic examination revealed all of the particles as spherical shaped with over 70 percent below 10 microns in diameter. The number average particle size was found to be 3.65 microns.

(B) Run A was repeated omitting the addition of dispersing agent and heating the mixture to 275° C. at a pressure of 975 p.s.i. Stirring was carried out for 9 minutes at a rate of 8,000 to 10,000 r.p.m. during which time the mixture cooled to 225° C. No dispersion was produced, all of the product being recovered as a singly stringy mass wrapped around the stirrer.

EXAMPLE II (A) 300 parts of a polyethylene having a density of 0.916 g./cc., a melt flow rate of 70 g. per 10 min. at 190° C., and a melting point of 103° C., 27 parts of a block copolymer of ethylene oxide and propylene oxide of 6,500 molecular weight and containing 50 weight percent of ethylene oxide and 50 weight percent of propylene oxide (Pluronic P-105), and 273 parts of water were charged to the dispersing apparatus. The mixture was blanketed with nitrogen, and heat was applied until the temperature of the mixture reached 250° C. under a pressure of 640 p.s.i. Stirring was started and continued at a rate of 8,000 to 10,000 r.p.m. for a period of 8 to 10 minutes to 150° C. Stirring was stopped, and the mixture was allowed to continue cooling down to about 90° C. The residual pressure was released, and the product was separated by filtration, washed with water, and dried. 270 parts of a white powder was recovered. A sieve analysis of the powder showed:

83 wt. percent passing 420 microns
38 wt. percent passing 297 microns
13.5 wt. percent passing 105 microns
0.3 wt. percent passing 53 microns Microscopic examination revealed the particles of the powder to be in the shape of almost perfect spheres and to have a number average particle size of 13.8 microns. Such a mixture is highly suitable for fluidized bed processes wherein spherical particles in the size range of about 95 to 500 microns are especially preferred.

(B) Run A was repeated using 27 parts of sodium stearate as the dispersing agent in place of the ethylene oxide/propylene oxide block copolymer. No dispersion was produced, all of the product being recovered as a single stringy mass wrapped around the stirrer.

EXAMPLE III

A series of dispersions were prepared from medium and high density polyethylenes. Reaction conditions and particle characteristics are presented in the following table:

TABLE 1

Polymer concentration: 50 percent
Dispersant:
  Type: Pluronic F-108
  Concentration: 9.0 percent (based on polymer)
Temperature: 200° C.
Pressure: 235 p.s.i.
Stirring:
  Rate: 8,000 to 10,000 r.p.m.
  Time: 7 minutes

| | | | |
|---|---|---|---|
| Polyethylene: | | | |
| Density, g./cc | 0.924 | 0.936 | 0.965 |
| Melt flow rate at 190° C., g./10 min | 22 | 22 | 19.5 |
| Melt flow rate at 200° C., g./10 min | 22 | 22 | 20 |
| Melting point, °C | 108 | 119 | 119 |
| Product: | | | |
| Yield percent | 95 | 95 | 95 |
| 100 wt. percent <, microns | 210 | 210 | 210 |
| 50 wt. percent <, microns | 9.9 | 11.9 | 12.9 |
| Number average particle size, microns | 4.8 | 5.0 | 5.1 |

EXAMPLE IV

A series of dispersions were prepared from low density low molecular weight polyethylene. These dispersions, when coated upon a glass plaque in a layer of about 6-mils thickness, formed continuous films upon drying in air at ambient temperature. Polymers, dispersing conditions, and particle characteristics are presented in the following table:

TABLE 2

| | | | | |
|---|---|---|---|---|
| Polymer: | | | | |
| Density, g./cc | 0.8976 | 0.8976 | 0.9009 | 0.9009 |
| Melt flow at 190° C | 6,600 | 6,600 | 3,040 | 3,040 |
| Melting point, °C | 91 | 91 | 92 | 92 |
| Parts | 300 | 300 | 300 | 300 |
| Water, parts | 273 | 273 | 273 | 273 |
| Dispersant: | | | | |
| Type (Pluronic) | F-108 | F-108 | F-108 | F-108 |
| Parts | 27 | 27 | 27 | 27 |
| Temperature, °C | 165 | 200 | 200 | 250 |
| Pressure, p.s.i | 101 | 235 | 235 | 650 |
| Stirring: | | | | |
| Rate, r.p.m.×10⁻³ | 8-10 | 8-10 | 8-10 | 8-10 |
| Time, minutes | 7-10 | 7-10 | 7-10 | 7-10 |
| Product: | | | | |
| Largest particle <, microns | 39 | 23 | 35 | 31 |
| 50 weight percent <, microns | 3.8 | 1.5 | 4.0 | 3.3 |
| Smallest particle <, microns | 1.0 | 1.0 | 1.0 | 1.0 |
| Number average particle size, microns | 0.938 | 0.781 | 0.979 | 0.889 |

EXAMPLE V

A series of dispersions were prepared from ethylene-vinyl acetate copolymers. These dispersions, when coated upon a glass plaque in a layer of about 6-mils thickness, formed continuous films upon drying in air. Copolymer compositions, dispersing conditions, and particle characteristics are presented in the following table. Since ethylene-vinyl acetate copolymers containing 40 or 50 percent or higher of vinyl acetate are completely amorphous, no melting points are shown for the fourth and fifth copolymers in the table.

TABLE 3

| Copolymer: | | | | | |
|---|---|---|---|---|---|
| Vinyl acetate, percent | 29 | 33 | 33 | 40 | 50 |
| Density, g./cc. | 0.95 | 0.95 | 0.95 | 0.95 | 0.95 |
| Melt flow at 190° C. | 150 | 25 | 15 | 1,900 | 92.4 |
| Melting point, ° C. | 58 | 62 | 65 | | |
| Parts | 300 | 300 | 300 | 300 | 300 |
| Water, parts | 273 | 273 | 273 | 273 | 273 |
| Disperant: | | | | | |
| Type (Pluronic) | F-108 | F-108 | F-108 | F-108 | F-108 |
| Parts | 27 | 27 | 27 | 27 | 54 |
| Temperature, ° C. | 200 | 200 | 250 | 200 | 200 |
| Pressure, p.s.i. | 235 | 235 | 650 | 235 | 235 |
| Stirring: | | | | | |
| Rate, r.p.m.×10⁻³ | 8-10 | 8-10 | 8-10 | 8-10 | 8-10 |
| Time, minutes | 7-10 | 7-10 | 7-10 | 7-10 | 7-10 |
| Product: | | | | | |
| Largest particle <, microns | 31 | 16 | 34 | 30 | 10 |
| 50 weight percent <, microns | 3.6 | 3.3 | 10 | 2.0 | 1.6 |
| Smallest particle <, microns | 1.0 | 1.0 | 1.0 | 1.0 | 1.0 |
| Number average particle size, microns | 1.36 | 2.56 | 2.84 | 0.79 | 0.84 |

EXAMPLE VI 300 parts of an ethylene-ethyl acrylate copolymer containing 15.1 percent of ethyl acrylate and having a density of 0.929 g./cc., a melt flow rate of 18 g. per 10 min. at 190° C., and a melting point of 85° C., 27 parts of Pluronic F-108, and 273 parts of deaerated water were charged to the reactor. The mixture was blanketed with nitrogen, and heat was applied until the mixture reached a temperature of 200° C. at 235 p.s.i. Stirring was commenced and continued at a rate of 8,000 to 10,000 r.p.m. for a period of 7 to 10 minutes. Stirring was stopped, the temperature allowed to drop to about 90° C., the residual pressure bled off, and the product recovered as in Example I, Run A. Analysis of the product for particle characteristics revealed the following:

Largest particle <, microns _____ 34.58
50 weight percent <, microns _____ 10
Smallest particle size <, microns _____ 1.5
Number average particle size, microns _____ 4.56
    Particle shape _____ Spherical

EXAMPLE VII

Example VI was repeated with an ethylene-methyl acrylate copolymer containing 16 percent of methylacrylate. This copolymer had a density of 0.93 g./cc., a melt flow rate of 7.3 g. per 10 min. at 190° C. and a melting point of 90° C. Analysis of the product for particle characteristics showed the following:

Largest particle <, microns _____ 34.58
50 weight percent <, microns _____ 10
Smallest particle observed <, microns _____ 1.5
Number average particle size, microns _____ 4.56
    Particle shape _____ Spherical

EXAMPLE VIII

Example VII was repeated with an ethylene-allyl alcohol copolymer containing 1.0 percent of allyl alcohol. This copolymer had a density of 0.92 g./cc., a melt flow rate of 500 g. per 10 min. at 190° C. and a melting point of 102° C. Particle analysis showed the following:

Largest particle <, microns _____ 23.3
50 weight percent <, microns _____ 4.0

Smallest particle observed <, microns _____ 1.0
Number average particle size, microns _____ 2.59
    Particle shape _____ Spherical While this invention has been disclosed and illustrated by the foregoing specific embodiments, it will be understood that the invention is obviously subject to other modifications and variations without departing from its broader aspects.

What is claimed is:

1. A process for preparing in finely divided form a normally solid, synthetic organic polymeric thermoplastic resin having a decomposition point higher than its melting point and less than the critical temperature of water which comprises the steps of
    (a) subjecting a mixture of said resin in molten form and about 0.8 to 9 parts by weight of water per part of resin to vigorous agitation in the presence of from about 2 to 25 parts by weight per 100 parts of resin of a water-soluble block copolymer of ethylene oxide and propylene oxide having a molecular weight above about 3500 and containing at least about 50% by weight of ethylene oxide in the absence of an organic solvent at a temperature below the degradation temperature of said polymeric thermoplastic resin and between about 115° and 325° C. and at a pressure between about 6 and 120 atmospheres such that a fine dispersion is produced, and then
    (b) cooling said dispersion to below the softening temperature of said resin.

2. The process of claim 1 wherein the resin is a polyolefin.

3. The process of claim 2 wherein the polyolefin is polyethylene.

4. The process of claim 1 wherein the resin is an olefin-vinyl copolymer.

5. The process of claim 4 wherein the olefin-vinyl copolymer is ethylene-vinyl acetate.

6. The process of claim 1 wherein the resulting solidified finely divided resin is recovered from the water dispersion and is substantially devoid of particles in excess of about 25 microns in size, has an average particle size of below about 10 microns, and is substantially spherical in shape.

7. The process of claim 1 wherein said molten resin exhibits a melt flow rate of at least about 2.

References Cited
UNITED STATES PATENTS

| | | | |
|---|---|---|---|
| 2,947,715 | 8/1960 | Charlet et al. | 260—29.6 |
| 2,995,533 | 8/1961 | Parmer et al. | 260—29.6 |
| 3,006,872 | 10/1961 | Benedict et al. | 260—29.6 |
| 3,055,853 | 9/1962 | Pickell | 260—29.6 |
| 3,073,790 | 1/1963 | Bosoni | 260—29.6 |
| 3,245,934 | 4/1966 | Krzyszkowski | 260—29.6 |
| 3,422,049 | 1/1969 | McClain | 260—29.6 |
| 3,432,483 | 3/1969 | Peoples et al. | 260—87.3 |

WILLIAM H. SHORT, Primary Examiner
E. A. NIELSEN, Assistant Examiner

U.S. Cl. X.R.

106—169, 188; 260—29.2 R, N, E, 29.6 NR, ME, XA, 75 T, 78 S, 86.7, 87.3, 88.1 R, 89.5 AW 92.1, 93.5 A, 94.9 A